US012731100B2

(12) United States Patent
Werdi

(10) Patent No.: US 12,731,100 B2
(45) Date of Patent: Sep. 8, 2026

(54) DELIVERY OF PACKAGE IN BUILDINGS PROVIDED WITH ELEVATORS

(71) Applicant: KONE Corporation, Helsinki (FI)

(72) Inventor: Nouri Werdi, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 18/894,202

(22) Filed: Sep. 24, 2024

(65) Prior Publication Data

US 2025/0013975 A1 Jan. 9, 2025

Related U.S. Application Data

(63) Continuation of application No. PCT/FI2022/050268, filed on Apr. 25, 2022.

(51) Int. Cl.
*G06Q 10/0835* (2023.01)
*B66B 1/46* (2006.01)
(Continued)

(52) U.S. Cl.
CPC ......... *G06Q 10/0835* (2013.01); *B66B 1/468* (2013.01); *G05D 1/667* (2024.01); *G07C 9/27* (2020.01); *B66B 2201/103* (2013.01); *B66B 2201/405* (2013.01); *B66B 2201/4615* (2013.01); *B66B 2201/4638* (2013.01);
(Continued)

(58) Field of Classification Search
CPC ...... G06Q 10/0835; G07C 9/27; G05D 1/667; G05D 2105/285; G05D 2101/22; G05D 2107/40; B66B 1/468; B66B 2201/22; B66B 2201/103; B66B 2201/405; B66B 2201/4615; B66B 2201/4638; B66B 2201/4653
See application file for complete search history.

(56) References Cited

U.S. PATENT DOCUMENTS

| | | | | |
|---|---|---|---|---|
| 10,345,818 | B2 * | 7/2019 | Sibley | B25J 9/1694 |
| 2019/0248013 | A1 * | 8/2019 | Deyle | B25J 13/006 |

(Continued)

FOREIGN PATENT DOCUMENTS

| | | |
|---|---|---|
| EP | 3 882 192 A1 | 9/2021 |

OTHER PUBLICATIONS

International Search Report, issued in PCT/FI2022/050268, dated Nov. 28, 2022.

(Continued)

*Primary Examiner* — Thomas D Alunkal

(74) *Attorney, Agent, or Firm* — Birch, Stewart, Kolasch & Birch, LLP

(57) ABSTRACT

A control system for arranging a transport of a package to a recipient in a building provided with an elevator system is described, the control system is configured to: determine an access right of a mobile robot carrying the package in response to a receipt of an access request descriptive of requesting an access of the mobile robot to the building; arrange an elevator service to the mobile robot in response to a detection that the mobile robot is provided with the access; and manage a delivery of the package to the recipient in response to a detection that the mobile robot resides in a predefined location with respect to the recipient in the building. A method and a computer program are also provided.

21 Claims, 3 Drawing Sheets

(51) Int. Cl.

| | |
|---|---|
| ***G05D 1/667*** | (2024.01) |
| ***G05D 101/00*** | (2024.01) |
| ***G05D 105/28*** | (2024.01) |
| ***G05D 107/40*** | (2024.01) |
| ***G07C 9/27*** | (2020.01) |

(52) U.S. Cl.

CPC .. *B66B 2201/4653* (2013.01); *G05D 2101/22* (2024.01); *G05D 2105/285* (2024.01); *G05D 2107/40* (2024.01)

(56) References Cited

U.S. PATENT DOCUMENTS

| | | | | |
|---|---|---|---|---|
| 2020/0061839 | A1* | 2/2020 | Deyle | G06Q 10/087 |
| 2020/0130893 | A1* | 4/2020 | Väin | G06Q 10/08 |
| 2020/0180903 | A1* | 6/2020 | Aberg | G05D 1/0285 |
| 2021/0287164 | A1* | 9/2021 | Keenan, Jr. | B66B 1/2408 |
| 2021/0387829 | A1* | 12/2021 | Min | B66B 1/2408 |
| 2021/0397188 | A1* | 12/2021 | Sato | G05D 1/0274 |
| 2022/0017332 | A1* | 1/2022 | Kim | B66B 13/14 |
| 2022/0106167 | A1* | 4/2022 | Carparelli | B66B 13/146 |
| 2022/0308556 | A1* | 9/2022 | Noda | B60Q 1/507 |
| 2023/0017144 | A1* | 1/2023 | Emacha | B25J 11/008 |
| 2023/0069625 | A1* | 3/2023 | Yi | G01C 21/206 |

OTHER PUBLICATIONS

Written Opinion of the International Searching Authority, issued in PCT/FI2022/050268, dated Nov. 28, 2022.

* cited by examiner

DELIVERY OF PACKAGE IN BUILDINGS PROVIDED WITH ELEVATORS

TECHNICAL FIELD

The invention concerns in general the technical field of building management. More particularly, the invention concerns controlling of a cooperation of different systems for an operation of a robot assigned with a specific task.

BACKGROUND

The development in various areas of technologies has enabled an autonomous driving of devices, such as mobile robots. This technical development has allowed introducing new service models in various business areas such as in a field of package delivery wherein the mobile robots have been involved in a delivery of packages, or other goods or food, to a destination. This kind of approach may bring efficiency in the delivery but also bring cost savings due to that human operator is not needed in the delivery.

However, the utilization of the mobile robots in the delivery of packages works satisfactorily to an extent that the mobile robot, such as an autonomous vehicle, operates outdoors and travels e.g. in public streets and follows the traffic regulations in place in the area of operation. This means that the mobile robot may bring the package at a door of the building the recipient resides, and the recipient picks up the package from the door.

The delivery becomes more complex in a situation where the intent is to arrange the delivery of packages in an end-to-end manner i.e. from the sender to the recipient so that the recipient meets the robot at her/his premises and not e.g. picking up the package from the outdoor of the building. The reason for the complexity—especially in case the recipient resides in a multi-floor building, such as in a block house—is that an access of the robot to the destination may require utilization and communication with various systems implemented in the building.

Hence, there is a need to introduce solutions enabling a delivery of packages with robots to recipients residing in building.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a control system, a method, and a computer program for arranging a transport of a package.

The objects of the invention are reached by a control system, a method, and a computer program as defined by the respective independent claims.

According to a first aspect, a control system for arranging a transport of a package to a recipient in a building provided with an elevator system is provided, the control system is configured to:

- determine an access right of a mobile robot carrying the package in response to a receipt of an access request descriptive of requesting an access of the mobile robot to the building,
- arrange an elevator service to the mobile robot in response to a detection that the mobile robot is provided with the access to the building, and
- manage a delivery of the package to the recipient in response to a detection that the mobile robot resides in predefined location with respect to the recipient in the building.

For example, the control system may be configured to determine the access right of the mobile robot based on data included in the access request received from at least one of: the mobile robot; a robot controller controlling the mobile robot; a monitoring system.

The control system may be configured to determine the access right based on data identifying the recipient of the package by performing a comparison of the data identifying the recipient of the package with reference data defining persons in the building.

The control system may further be configured to, in response to an outcome of a determination that the mobile robot is allowed to access the building, generate a control signal to open an access door to the mobile robot.

Moreover, the control system may, in response to an outcome of a determination that the mobile robot is allowed to access the building, further be configured to:

- generate data descriptive of at least one of the following: a route in the building to deliver the package; a utilization of at least one system communicatively available in the building, and
- deliver the data generated by the control system to the mobile robot.

The control system may be configured to arrange the elevator service to the mobile robot in response to a detection that the mobile robot resides in the building in a predefined location with respect to an elevator door in a floor of the building the mobile robot resides. For example, the control system may be configured to determine the location of the mobile robot based on data received from at least one of: the mobile robot; a sensor system implemented in the building.

The control system may be configured to generate a control signal to an elevator controller to arrange the elevator service to the mobile robot, the control signal comprising data defining at least one of: the floor the mobile robot resides; a destination floor the mobile robot travels to.

Still further, the control system may be configured to manage the delivery of the package to the recipient by generating a message to the recipient indicative that the mobile robot has arrived at a location of delivery. The control system may e.g. be configured to include an access code to the message, the access code providing an access to a container of the mobile robot storing the package under delivery.

According to a second aspect, a method, performed by a control system, for arranging a transport of a package to a recipient in a building provided with an elevator system is provided, the method comprises:

- determining an access right of a mobile robot carrying the package in response to a receipt of an access request descriptive of requesting an access of the mobile robot to the building,
- arranging an elevator service to the mobile robot in response to a detection that the mobile robot is provided with the access to the building, and
- managing a delivery of the package to the recipient in response to a detection that the mobile robot resides in predefined location with respect to the recipient in the building.

For example, the access right of the mobile robot may be determined based on data included in the access request received from at least one of: the mobile robot; a robot controller controlling the mobile robot; a monitoring system.

The access right may be determined based on data identifying the recipient of the package by performing a comparison of the data identifying the recipient of the package with reference data defining persons in the building.

The method may further comprise: generating, in response to an outcome of a determination that the mobile robot is allowed to access the building, a control signal to open an access door to the mobile robot.

In response to an outcome of a determination that the mobile robot is allowed to access the building the method may further comprise:

- generating data descriptive of at least one of the following: a route in the building to deliver the package; a utilization of at least one system communicatively available in the building, and
- delivering the data generated by the control system to the mobile robot.

The elevator service may be arranged to the mobile robot in response to a detection that the mobile robot resides in the building in a predefined location with respect to an elevator door in a floor of the building the mobile robot resides. The location of the mobile robot may be determined based on data received from at least one of: the mobile robot; a sensor system implemented in the building.

A control signal may be generated to an elevator controller to arrange the elevator service to the mobile robot, the control signal comprising data defining at least one of: the floor the mobile robot resides; a destination floor the mobile robot travels to.

The delivery of the package to the recipient may be managed by generating a message to the recipient indicative that the mobile robot has arrived at a location of delivery. An access code may be included to the message, the access code providing an access to a container of the mobile robot storing the package under delivery.

According to a third aspect, a computer program is provided, the computer program comprising computer readable program code configured to cause performing of the method according to the second aspect as defined above when the computer readable program code is run on one or more computing apparatuses.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
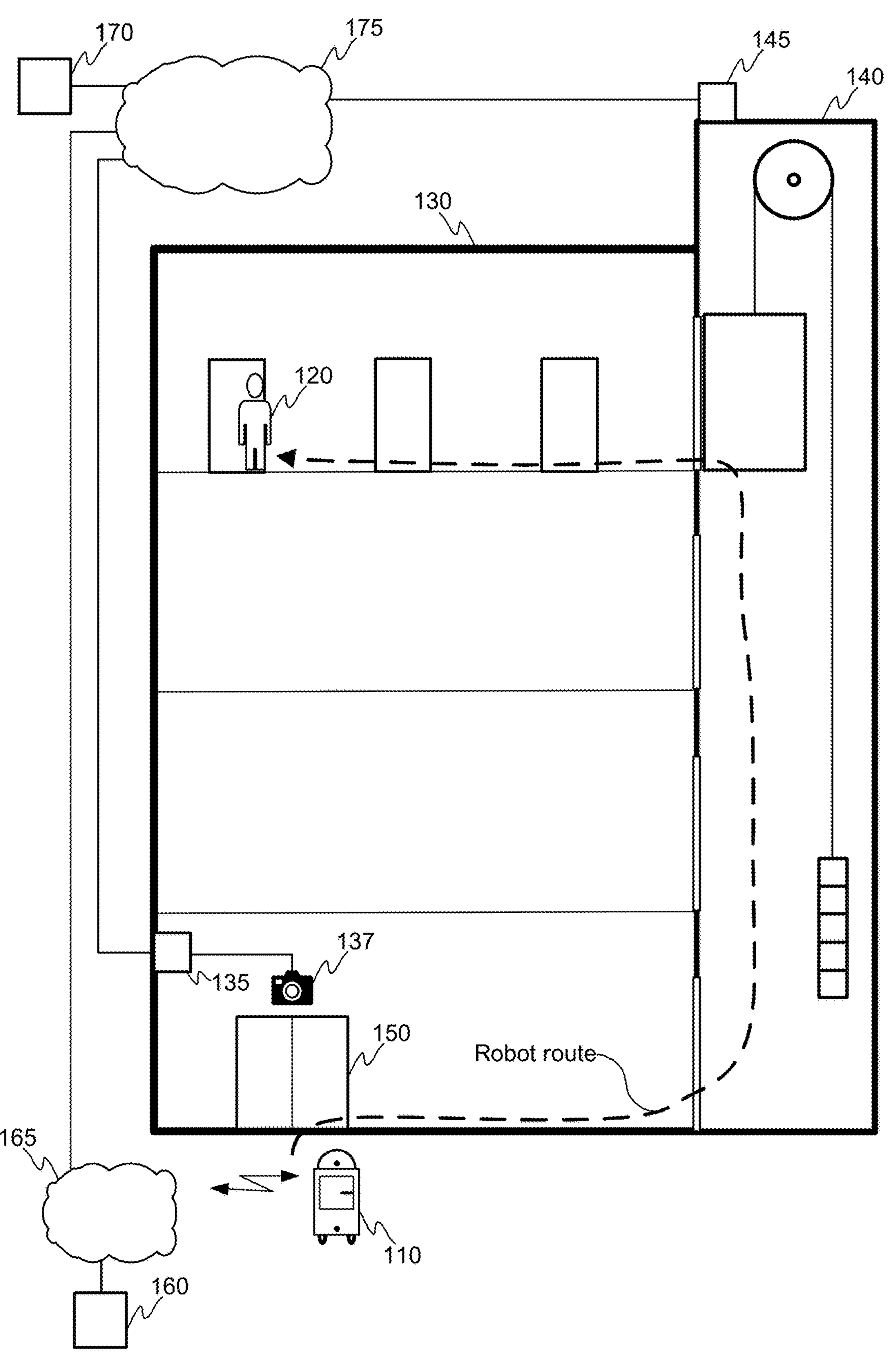
FIG. 1 illustrates schematically an application environment according to an example.

FIG. 1 illustrates schematically an application environment of the present invention according to an example embodiment. The invention may be implemented in an environment in which a delivery, such as a package delivery, is arranged by using a robot 110 being mobile in nature and capable of traveling in an autonomous manner in accordance with instructions provided to it. In the forthcoming description the robot 110 is called as a mobile robot and referred with the reference 110. As said, the delivery of the package, or anything similar, is in accordance with the present solution arranged so that the mobile robot 110 transports the package to a recipient 120 residing in a building 130 comprising a plurality of systems and wherein the building 130 is a multistorey building in which a travel between at least some of the floors may occur with an elevator system 140. Hence, for the purpose of describing at least some aspects of the present invention it is assumed that the recipient 120 of the delivery resides in a floor requiring traveling with an elevator 140 from an entrance door 150 from which the mobile robot 110 may access the building 130.

The elevator system 140 may be any kind of elevator configured to provide transportation service between at least some of the floors in the building 130. The elevator system 140 may comprise one or more elevators for serving visitors of the building 130. The elevator system 140 is controlled by an elevator controller 145 which is configured to generate control signals in accordance with an input received from a number of sources in order to manage a service provision of the elevator system 140 in the building 130.

The building 130 may also be provided with other systems wherein at least one of the systems may be an access control system managed by an access controller 135. The access control system may be configured to control a number of entities in the building such as at least some doors, some gates, and/or similar entities. In other words, the access control system may e.g. be configured to generate control signals to lock and unlock entities under control of it as well as to generate further control signals e.g. for opening and closing the same entities. As a non-limiting example the access controller 135 may generate a control signal to unlock the door 150 of the building 130 and opening it without any physical interaction required by a user, or by the party using the door, such as the mobile robot 110. Correspondingly, the access controller 135 may generate control signals for closing the door 150 and for locking it. As said, the access controller 135 may be configured to control also other entities than the entrance door 150 e.g. in a travel path of the mobile robot 110 in the building 130.

The access control system may also comprise a sub-system for monitoring events in a predefined areas of the building. The monitoring system referred with 137 in FIG. 1 may comprise a number of sensors, such as image capturing devices, readers and/or similar, for monitoring various areas, or spaces, of the building, such as the area in front of the entrance door 150 and also inside the building, such as a hall area of the building. For sake of completeness it is worthwhile to mention that the monitoring system 137 may be a sub-system of the access control system or a separate system configured to perform as described in the forthcoming description. The monitoring system 137 may e.g. be configured to generate various signals either alone or in cooperation with the access controller, such as access requests as is described in the forthcoming description.

The building 130 may also be equipped with various further systems, such as different kind of communication systems, such as Wi-Fi based wireless local area network, and indoor positioning system utilizable by entities allowed to access them.

Figure 2:
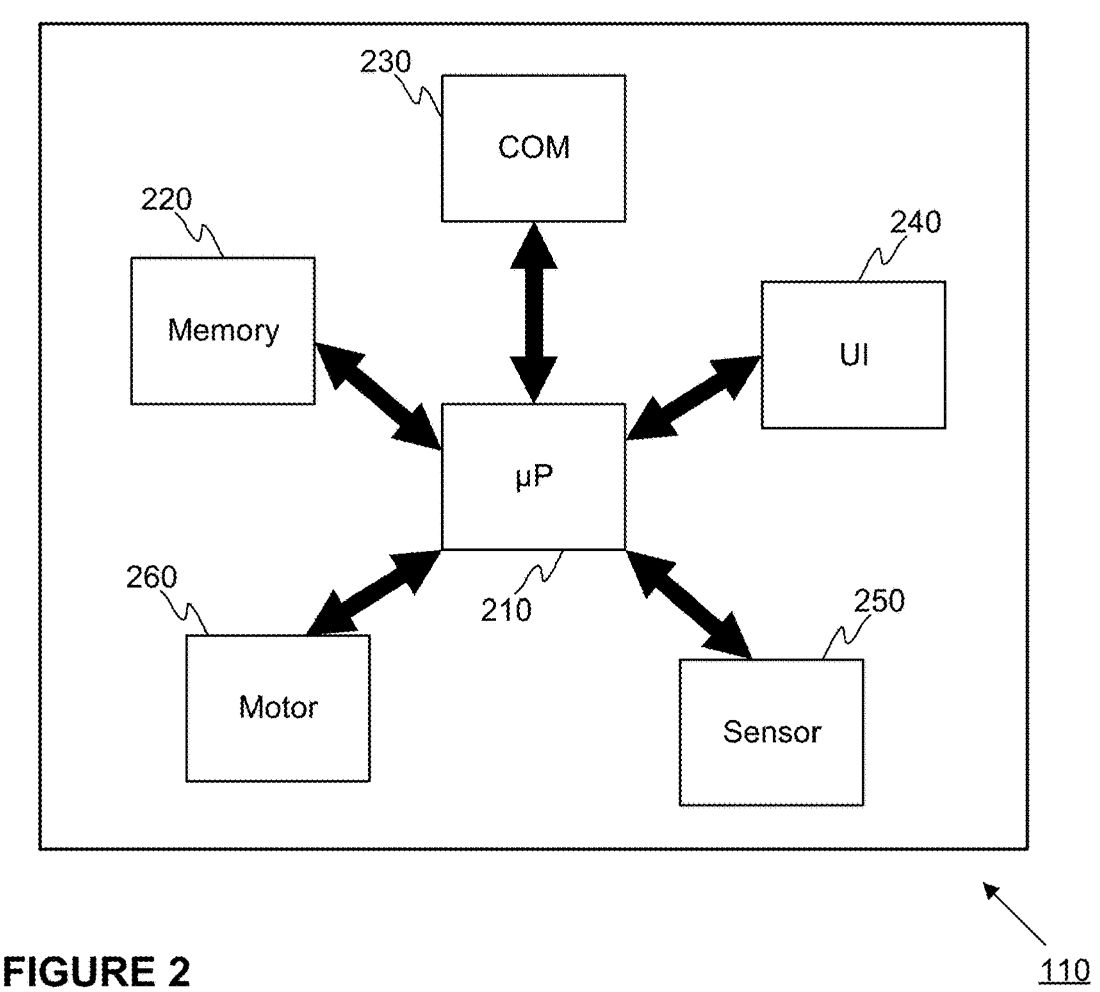
FIG. 2 illustrates schematically a mobile robot according to an example.

FIG. 2 illustrates schematically an example of the mobile robot 110 according to an example embodiment configurable to perform the delivery of the package to the destination. The mobile robot 110 may comprise at least the following entities: a processing unit 210, a memory unit 220, a communication unit 230, a user interface (UI) unit 240, a sensor unit 250 and a motor unit 260. The mentioned entities may comprise one or more operating units, e.g. one or more microprocessors or similar, one or more memories, one or more communication devices, such as modems, one or more user interface devices, one or more sensors and one or more motors among other components of the respective entities if any. In addition to the mentioned entities the mobile robot 110 may comprise further devices and entities, such as batteries for storing energy to be used by the other entities. The entities belonging to the mobile robot 110 may be communicatively coupled to each other with e.g. a communication bus. The processing unit 210 may be configured to control the operation of the mobile robot 110 as well as a communication with external entities e.g. in a manner as described in the forthcoming description. The communication with the external entities may be performed e.g. in a wireless manner. In accordance with at least some example embodiments the user interface unit 240 of the mobile robot 110 may comprise a container for the package arranged to be transported by the mobile robot 110. Generally speaking, the container shall be understood as any space into which the package may be positioned so as to enable the transportation. In some implementations the container may be lockable so as to prevent $3^{rd}$ persons to access the package during the transportation. Various approaches to unlock the container may be implemented as is described in the forthcoming description. The sensor unit 250 may comprise any sensors by means of which the mobile robot 110 may obtain information on an environment, but also the sensor unit 250 may comprise sensors enabling positioning and/or navigation within the location. This may refer to devices enabling a utilization of one or more indoor positioning systems, e.g. those implemented in the building 130. For sake of completeness the indoor positioning may, in some implementations, be based on a communication implemented over the communication interface 230 of the mobile robot 110. The processing unit 210 may also be configured to generate control signals to the motor unit 260 in order to make the mobile robot 110 to move. Moreover, the mobile robot 110 may comprise means enabling the robot to be mobile, such as any applicable transport means like wheels with other required elements and devices. The operation of the processing unit 210 may be achieved by executing portions of computer program code stored e.g. in the memory unit 220 for generating the control signals and, thus, causing the mobile robot 110 to operate in the manner as described. The memory unit 220 may also be used for storing obtained and received information together with any other data either permanently or temporarily. Still further, it is worthwhile to mention that the communication unit 230 may, as already mentioned, comprise a number of devices configured to implement selected communication technologies preferably in a wireless manner so as to make the mobile robot 110 capable of communicating with various parties.

The mobile robot 110 may be communicatively connected to a robot controller 160 over a communication network 165 which may be a mobile communication network enabling a wireless communication with the mobile robot 110. The robot controller 160 may be a computing device generating control signals to the mobile robot 110 as well as may receive signals from the mobile robot 110. Additionally, the robot controller 160 may be communicatively connected to other entities as is described in the forthcoming description. The robot controller 160 may e.g. deliver control signal to the mobile robot 110 wherein the control signal may e.g. carry data indicative of a destination of a package and other instructions in relation to the delivery. As a result of this the mobile robot 110 may e.g. travel in an autonomous manner to the building 130 and request accessing the building 130 in order to perform the delivery as is described in the forthcoming description. In accordance with some example embodiments the sender of package may be communicatively connected from their own system to the robot controller 160 in order to arrange a delivery of the package with the mobile robot 110 managed by the robot controller 160. In other words, an operator of the mobile robot system may provide the delivery service to other entities.

In accordance with an example embodiment the system may comprise a control system 170 configured to orchestrate a delivery of the package by the mobile robot 110 in the building 130. The control system 170 may be accessible over a communication network 175 which may be a data network, such as Internet. The communication network 175 may be communicatively operative with the other communication network 165 in a known manner. In some example embodiment the communication networks referred with 165 and 175 in FIG. 1 may be the same network. Hence, the control system 170 may be communicatively connected with other entities either directly or indirectly, such as with the elevator controller 145, the access controller 135, and the robot controller 160 over the communication networks 165, 175. In some example embodiments, the mobile robot 110 may be provided with an application enabling communication with the control system 170 without guiding the communication between the mobile robot 110 and the control system 170 through the robot controller 160. In other words, the control system 170 is provided with interfaces, such as application programming interfaces (API), enabling the communication between the mentioned entities. For sake of clarity it is worthwhile to mention that a functionality of the control system 170 may be integrated into at least one of the other controllers 135, 145, 160 introduced in the foregoing description.

Figure 3:
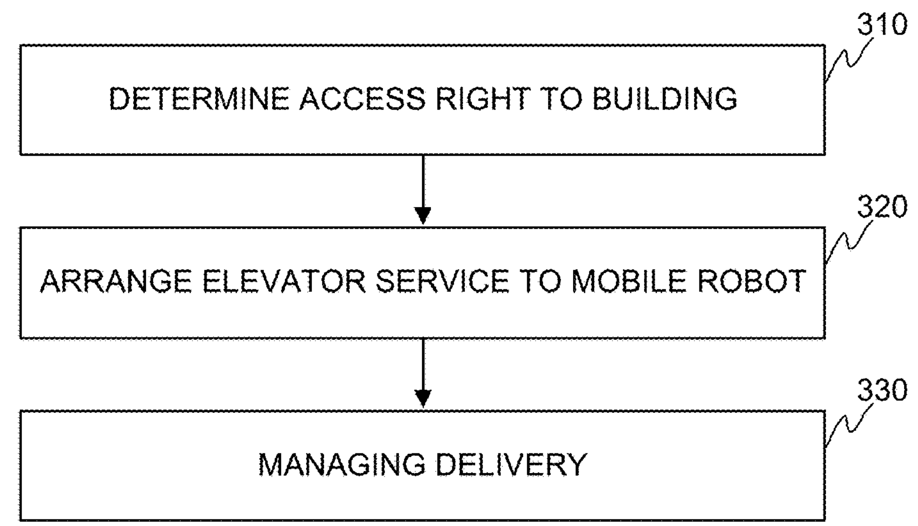
FIG. 3 illustrates schematically a method according to an example.

Next further aspects in relation to the invention are described by referring to FIG. 3. FIG. 3 illustrates schematically an example embodiment of a method according to the invention. The method is described from the control system 170 point of view in FIG. 3. As derivable from the foregoing description the mobile robot 110 is provided with a task to deliver a package to a destination residing in the building 130 and as a starting point for describing at least some aspects in relation to the invention the mobile robot 110 has arrived at an access door of the building 130 which may e.g. be the entrance door 150 of FIG. 1. It is also hereby assumed that the mobile robot 110 is arranged to communicate with the control system 170 over the robot controller 160. The mobile robot 110 may either inform the robot controller 160 on the arrival at the entrance door 150 or the robot controller 160 may be configured to monitor a location of the mobile robot 110 during the task and to detect that the mobile robot 110 has arrived at the building 130 and resides in a predefined vicinity from the entrance door 150. In response to the arrival the robot controller 160 may, in response to a receipt of an acknowledgement signal indicative of the arrival from the mobile robot 110 or in response to the internal detection as described, generate an access request to the control system 170 for requesting access in the building 130. The control system 170 may, in accordance with some example embodiments, be configured to perform a security check for deciding if an access right may be provided or not to the mobile robot 110. The security check may e.g. be based on data delivered together with the access request. Such data may e.g. comprise data identifying the mobile robot 110 as well as the destination of the delivery, such as information on the recipient of the delivery. The control system 170 may have access to reference data against which the control system 170 may be configured to compare the received data in the access request. For example, the control system 170 may have received information defining aspects in relation to the delivery, such as an identifier of the mobile robot 110 assigned with the task of delivery as well as a time window representing an estimation on the time of delivery. The control system 170 may be configured to compare these aspects in response to the receipt of the access request in order to validate if an access right may be provided to the mobile robot 110 residing in front of the entrance door 150 or not. Alternatively or in addition, the data descriptive of the destination, e.g. comprising the name of the recipient or any other identification information, such as a detailed address, may be compared to reference data accessible by the control system 170 which e.g. may comprise a list of persons, such as inhabitants or workers, in the building, and if a match is found the access right may be granted. Additionally, the control system 170 may, in this context, be configured to determine a route from the entrance door 150 to the destination, i.e. to the recipient, in the building 130. An example of the route is marked as a dashed line in FIG. 1.

For sake of clarity it is worthwhile to mention that the receipt of the access request may also comprise a procedure in which an authentication session is set up between the control system 170 and the robot controller 160, or even between the control system 170 and the mobile robot 110, so as to perform the determination 310 on the access right by exchanging required data. Hence, reverting back to the FIG. 3 the first step in the method is that the control system 170 is configured to determine an access right of the mobile robot 110 to the building 130. In case the determination of the access right generates an outcome that the access right is denied to the control system 170 may be configured to not taking any actions or generate an acknowledgement to the robot controller 160 to indicate that the access right is denied to. If the outcome of the determination 310 is that the mobile robot 110 has a right to access the building 130, the control system 170 may be configured to generate a control signal to the access controller 135 of the building 130 which control signal comprises data indicative to that the entrance door 150 is allowed to be opened to the mobile robot 110, and the access controller 135 may operate accordingly, i.e. to generate respective control signal to cause an opening of the entrance door 150. Moreover, the access controller 135 may, upon a detection that the mobile robot 110 has entered in the building 130, generate another control signal to close the entrance door 150.

The above described embodiments are based on an approach in which the access request is either directly or indirectly originated from the mobile robot 110. In accordance with some other approaches the access request may be based on data received from the monitoring system 137. For example, one or more sensors of the monitoring system 137 may be configured to generate data based on which a detection of the mobile robot 110 may be performed. According to an implementation a camera may be configured to capture images from an area outside the building 130 and to detect if a mobile robot 110 arrives in the area under monitoring. In response to the detection of the mobile robot 110 the monitoring system 137 may generate a detection result to indicate that a mobile robot 110 requests access to the building 130. The indication may e.g. be generated as an access request to the control system 170 which may determine if an access right may be granted to the mobile robot 110. In a more sophisticated solution the mobile robot 110 may be provided with an identifier, such as an applicable code, mounted on an outer surface of the mobile robot 110 which may be captured in an image with the image capturing device. The image data may then be analyzed so that the entity determining the access rights may compare the identifier, i.e. the data representing the code, to reference data accessible by the control system 170 which may e.g. define mobile robots 110 heading to the building in question 130 in a certain time frame, and as a result of the comparison it is possible to indicate if the access right may be provided or not. The identifier may e.g. be a QR code, a bar code, or any similar by means of which the mobile robot 110 may be identified. According to a still further approach the mobile robot 110 may be configured to interact with a reader device mounted at the entrance floor as the sensor belonging to the monitoring system. The mobile robot 110 may be provided with a tag, or any other device, suitable to interact with the reader device and deliver data stored in the tag or similar to convey data to the monitoring system 137 which data may then be used for determining 310 if the access right may be granted or not. As said, the entity performing the evaluation on the access right may be the control system 170, but some preprocessing may already be done in the monitoring system 137.

In case the access right is granted to the mobile robot 110 it may be communicated to the mobile robot 110. The communication may be performed either through the robot controller 160 or directly to the mobile robot 110 in case a communication connection is possible to be directly established. The communication may comprise data generated by the control system 160, the data being indicative of that the mobile robot 110 may access the building 130 through the entrance door 150. In addition to that the control system 170 may have generated further data to be included in the communication with the mobile robot 110. The further data may comprise data defining instructions how the mobile robot 110 may find its way to the recipient 120 in the building 130, i.e. a route data to the recipient. In other words, the further data may comprise so-called driving instructions to the destination in the building 130. Such data may e.g.

define a route e.g. in a map data of the building 130 the mobile robot 110 shall follow in the building 130. The data generated by the control system 170 may also comprise additional data defining at least one system available for utilization communicatively in order to keep on track on the location with respect to the defined route in the building 130. For example, the additional data may define an indoor positioning system to be connected with for the mobile robot 110 together with any access information, such as password, if applied therein. Moreover, the further data may comprise data descriptive of a communication networks available in the building 130, such as Wi-Fi network, with any access credentials to it so that the mobile robot 110 is able to connect to the communication network provided in the building 130. In accordance with some example embodiments the mobile robot 110 is required to connect to a communication network available in the building 130 in order to access the building 130. This kind of approach improves a security since a roaming of the mobile robot 110 in the building may be monitored e.g. by the control system 170 in real-time, or at least in an acceptable accuracy. In a still further embodiments the communication connection of the mobile robot 110 may be used for controlling the movement of the mobile robot 110 in the building 130 by the control system 170. In other words, the control of the movement of the mobile robot 110 may be granted to the control system 170 which generates instructions to mobile robot 110 e.g. in a continuous manner to lead the mobile robot 110 to the destination in a controlled manner.

In response to the provision of an access to the building 130 the mobile robot 110 may start entering and initiating its travel to the destination. The provision of the access to the building 130 is to be understood in a broad manner and it comprises at least that the access right is granted, but also it may comprise further aspects in relation to accessing the building 130 as described in the following. Namely, the control system 170 may be configured to receive data indicative of that the mobile robot 110 shall be served by an elevator system 140 at some instant of time and, thus, arrange 320 an elevator service to the mobile robot 110. This may be determined if the route is generated by the control system 170 in the context of the access right determination but also by receiving data indicative on that the mobile robot 110 is to be served by the elevator system 140. The data indicative of it may e.g. be data received from the mobile robot 110 itself. For example, the mobile robot 110 may travel to an elevator door in the respective floor and inform its location to the robot controller 160. The robot controller 160 may inform the location of the mobile robot 110 to the control system 110, which, in turn, determines, based on the location of the mobile robot 110 that elevator service is needed and generates a service call to the elevator system 140 accordingly. Alternatively, the location of the mobile robot 110 may be detected by a sensor system arranged in the building 130, such as based on data generated by an indoor positioning system or any other sensor, such as an image capturing device configured to monitor an elevator door area, which information is received by the control system 170 and applied in a manner that the elevator call is generated to. Moreover, the triggering of the service call to the elevator system 140 may be dependent on the access of the mobile robot 110 to the building 130. For example, it may be triggered when the access right is granted even if the mobile robot 110 has not entered the building 130 yet or it may be triggered upon a detection that the mobile robot 110 enters the building 130 e.g. through the entrance door 150. The detection of the triggering event may be based on the systems and devices already described herein (cf. the sensor solutions and similar). Hence, depending on various implementational approaches the elevator call may be generated at various instants of time when the access is provided to the mobile robot 110 to the building 130. In case the service call is generated to the elevator system immediately when the access right is granted it may increase efficiency due to that the elevator car is instructed at the floor upon the mobile robot 110 is in a predefined vicinity from the entrance to the elevator car, but, of course, this may be related to occupancy situation of the elevator system and other parameters therein.

In response the elevator car arrives in the floor the mobile robot 110 resides the elevator controller 145 may be configured to inform this to the control system 170, which, in turn, may acknowledge it to the robot controller 160 and eventually the information reaches the mobile robot 110. In response to the receipt of the acknowledgement the mobile robot 110 travels to the elevator car either through internal instructions or through a control of an external entity, such as the control system 170 either directly or through another entity, such as the robot controller 160. Depending on the implementation the mobile robot 110 may be configured to provide the destination call to the elevator car through the same communication path as described or directly with the elevator system 140 and the elevator controller 145 therein if such a communication channel is established. Alternatively, a detection of the entry of the mobile robot 110 to the elevator car may trigger the destination call in example embodiments in which the route of the mobile robot 110 in the building 130 is known by the control system 170. Hence, the control system 170 may generate a control signal to the elevator controller 145 accordingly. In still further embodiments the information on the destination floor may be received in the context of the elevator call from the same data source as already described, such as from the route information determined for the mobile robot 110.

In response to an arrival to the destination floor the elevator doors are opened in a known manner and the elevator controller 145 may be configured to generate an acknowledgement to the control system 170 on that the mobile robot 110 may exit the elevator car and the information may be delivered to the robot controller 160 and eventually to the mobile robot 110. In some other example embodiments in which the mobile robot 110 comprises the communication interface with the elevator system 140 a status information of the elevator system 140 may directly be provided to the mobile robot 110. In response to the receipt of the information, and any control signal, if any the mobile robot 110 exits the elevator car and continues the roaming to the destination in accordance with the route information, and in response to any control operations as described.

At some point the mobile robot 110 reaches the destination and it is detected by the control system 170, and the control system 170 initiates a management 330 of the delivery. The detection may be based on data received from the mobile robot 110 either directly or through the robot controller 160 and the data may e.g. indicate that the mobile robot 110 resides in a predefined location with respect to the recipient, such as in front of a door the recipient lives or in another predefined location. The same information may be received from a sensor system established in the building in the same manner as described earlier. In response to this the control system 170 may be configured to perform operations under the managing 330 of the delivery wherein the operations may comprise a number of actions. First, it may be generated to cause a messaging to the recipient for indicating that the package has arrived. The messaging may be arranged by utilizing a contact address, such as a phone number or an email, of the recipient if it is received e.g. in the access request by the control system, and the control system 170 may generate a message in accordance with the applied technology to be sent to the recipients user device. The message may also comprise an access code to the container of the mobile robot 110 if the package resides in such a locked container having a user interface to insert the access code by the recipient. The control system 170 may e.g. have inquired the code from the robot controller 160 prior to generating the message as described. The message may also comprise information to the recipient, such as a definition of a time the mobile robots 110 waits in the predefined location i.e. at the destination, so as to cause the recipient to take actions with respect to the delivery. As a result the recipient approaches the mobile robot 110 and accesses the container e.g. with the access code if applied to, or somehow else, and the package is received by the recipient from mobile robot 110. In response to this the mobile robot 110 may be configured to generate an acknowledgement indicative of the completed delivery which may be delivered to the control system 170 e.g. through the robot controller 160, or the control system 170 may receive a confirmation from the recipient. In response to finalizing the delivery the control system 170 may be configured to store an indication on the successful delivery and e.g. to generate instructions, such as an exit route, for the mobile robot 110, and orchestrate the exiting of the mobile robot 110 from the building 130. Hence, the managing 330 of the delivery may comprise various operations in order to enable the mobile robot 110 hand over the package to the recipient.

Moreover, it is clear that the buildings 130 in which the mobile robot 110 provides the delivery service of the package may comprise inside doors and gates and any similar. In case the inside doors and similar are so-called automatic doors the mobile robot 110 may pass by the door locations automatically since the door is opened upon a detection of the object, i.e. the mobile robot 110, in a predefined vicinity with respect to the respective door. On the other hand, if the doors are not automatic as such controlling an opening of those may be arranged distantly e.g. by monitoring a location of the mobile robot 110 in the building and comparing it with respect to any inside doors, and similar, and in response to a detection that the mobile robot 110 resides in a location wherein a door blocks forwarding in the route, a control signal to open the door may be generated by the control system 170. In order to generate the control signal further control methods may be associated to it. Namely, in accordance with some example embodiments the mobile robot 110 may be identified at the location of the respective door. For example, a reader device may be positioned at the door area and the mobile robot 110 may be requested to interact with the reader device in a predefined manner in order to access the door. For example, the interaction may be performed in a wireless manner, e.g. utilizing some short-range communication technology, over which the mobile robot 110 may be configured to provide identification data e.g. in a form of the previously mentioned codes, such as QR code or similar, and the control system 170 is configured to analyse if the received identification data qualifies the mobile robot 110 to access the respective door. Alternatively or in addition, the mobile robot 110 may be identified with a camera solution, or any other sensor solution, configured to monitor the door area. In response to the positive result of the evaluation if the mobile robot 110 may access the respective door or similar, a control signal is generated to a door controller from the control system 170 to open the respective door.

Figure 4:
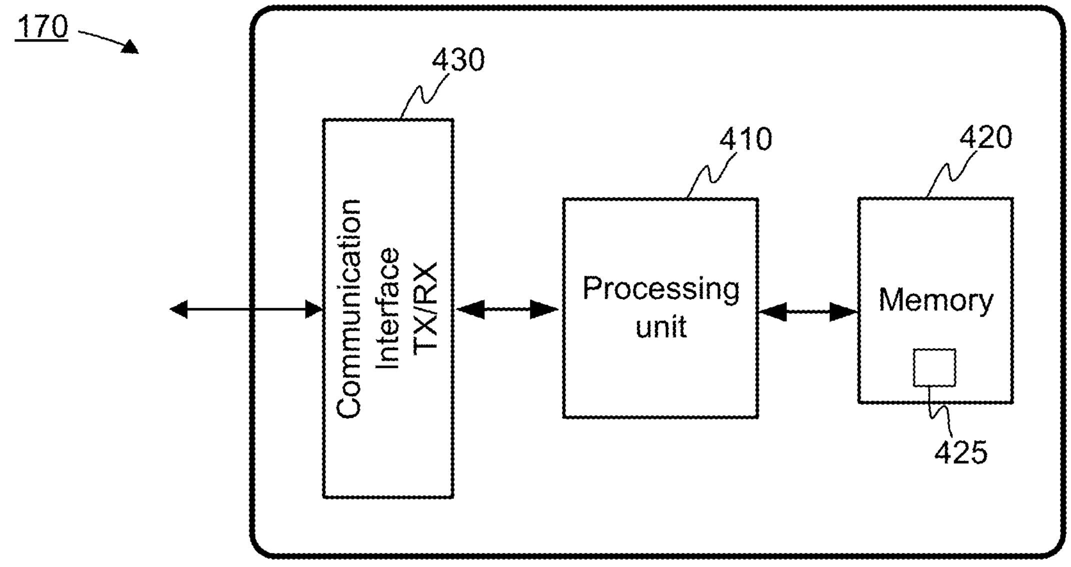
FIG. 4 illustrates schematically a control system according to an example.

As already mentioned, the aspects of the present invention described herein are mainly done by referring to an implementation in which the controlling entity is a dedicated control system 170 as shown in FIG. 1. As already mentioned, the functionality of the control system 170 may also be integrated to another computing device. An example of such an apparatus configurable to implement the operation of the computing device, and, thus, the control system 170, is schematically illustrated in FIG. 4. In other words, the control system 170 may be configured to perform the method according to the invention as described with the examples in the foregoing description. In other words, the apparatus of FIG. 4 may be configured to perform a function to arrange a transport of a package to a recipient in a building provided with an elevator system 140. For sake of clarity, it is worthwhile to mention that the block diagram of FIG. 4 depicts some components of an entity that may be employed to implement a functionality of the apparatus. The apparatus of FIG. 4 comprises a processor 410 and a memory 420. The memory 420 may store data, such as pieces of data as described, but also computer program code 425 causing the arranging of the transport, or delivery, of the package to the recipient in the described manner. The apparatus may further comprise a communication interface 430, such as a wireless communication interface or a communication interface for wired communication, or both to communicate with other entities as described. The communication interface 430 may thus comprise one or more modems, antennas, and any other hardware and software for enabling an execution of the communication e.g. under control of the processor 410. Furthermore, I/O (input/output) components may be arranged, together with the processor 410 and a portion of the computer program code 425, to provide a user interface for receiving input from a user, such as from a technician, and/or providing output to the user of the apparatus when necessary. In particular, the user I/O components may include user input means, such as one or more keys or buttons, a keyboard, a touchscreen, or a touchpad, etc. The user I/O components may include output means, such as a loudspeaker, a display, or a touchscreen. The components of the apparatus may be communicatively connected to each other via data bus that enables transfer of data and control information between the components.

The memory 420 and at least a portion of the computer program code 425 stored therein may further be arranged, with the processor 410, to cause the apparatus to perform at least a portion of a method as is described herein. The processor 410 may be configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some, or all of which may be integrated/removable and/or may provide permanent/semi-permanent/dynamic/cached storage.

The computer program code 425 may comprise computer-executable instructions that implement functions that correspond to steps implemented in the method when loaded into the processor 410 of the respective control system 170. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus to perform a method as described. Hence, the apparatus may comprise at least one processor 410 and at least one memory 420 including the computer program code 425 for one or more programs, the at least one memory 420 and the computer program code 425 configured to, with the at least one processor 410, cause the apparatus implementing the control system 170 to perform the method.

The computer program code 425 may be provided e.g. a computer program product comprising at least one computer-readable non-transitory medium having the computer program code 425 stored thereon, which computer program code 425, when executed by the processor 410 causes the apparatus to perform the method. The computer-readable non-transitory medium may comprise a memory device or a record medium, such as a CD-ROM, a DVD, a Blu-ray disc, or another article of manufacture that tangibly embodies the computer program. As another example, the computer program may be provided as a signal configured to reliably transfer the computer program.

Still further, the computer program code 425 may comprise a proprietary application, such as computer program code for causing an execution of the method in the manner as described in the description herein.

Any of the programmed functions mentioned may also be performed in firmware or hardware adapted to or programmed to perform the necessary tasks.

For sake of completeness it is worthwhile to mention that the entity performing the method in the role of the control system 170 may also be implemented with a plurality of apparatuses, such as the one schematically illustrated in FIG. 4, as a distributed computing environment corresponding to a control system. For example, one of the apparatuses may be communicatively connected with the other apparatuses, and e.g. share the data of the method, to cause another apparatus to perform at least one other portion of the method. As a result, the method performed in the distributed computing environment generates the detection result as described. For example, some steps of the method may be shared between the control system 170, the elevator controller 145, the access controller 135, and the robot controller 160 at least in part.

Some aspects of the invention may relate to a system comprising the entities as described and configured to implement the method as described in the foregoing description.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A control system for arranging a transport of a package to a recipient in a building provided with an elevator system, the control system is configured to:

determine an access right of a mobile robot carrying the package in response to a receipt of an access request descriptive of requesting an access of the mobile robot to the building, arrange an elevator service to the mobile robot in response to a detection that the mobile robot is provided with the access to the building, and manage a delivery of the package to the recipient in response to a detection that the mobile robot resides in predefined location with respect to the recipient in the building, wherein the control system is configured to determine the access right based on data identifying the recipient of the package by performing a comparison of the data identifying the recipient of the package with reference data defining persons in the building stored in the control system.

2. The control system according to claim 1, wherein the control system is configured to determine the access right of the mobile robot based on data included in the access request received from at least one of: the mobile robot; a robot controller controlling the mobile robot; a monitoring system.

3. The control system according to claim 1, the control system is further configured to, in response to an outcome of a determination that the mobile robot is allowed to access the building, generate a control signal to open an access door to the mobile robot.

4. The control system according to claim 1, the control system is, in response to an outcome of a determination that the mobile robot is allowed to access the building, further configured to:

generate data descriptive of at least one of the following: a route in the building to deliver the package; a utilization of at least one system communicatively available in the building, and deliver the data generated by the control system to the mobile robot.

5. The control system according to claim 1, wherein the control system is configured to arrange the elevator service to the mobile robot in response to a detection that the mobile robot resides in the building in a predefined location with respect to an elevator door in a floor of the building the mobile robot resides.

6. The control system according to claim 5, wherein the control system is configured to determine the location of the mobile robot based on data received from at least one of: the mobile robot; a sensor system implemented in the building.

7. The control system according to claim 1, wherein the control system is configured to generate a control signal to an elevator controller to arrange the elevator service to the mobile robot, the control signal comprising data defining at least one of: the floor the mobile robot resides; a destination floor the mobile robot travels to.

8. The control system according to claim 1, wherein the control system is configured to manage the delivery of the package to the recipient by generating a message to the recipient indicative that the mobile robot has arrived at a location of delivery.

9. The control system according to claim 8, wherein the control system is configured to include an access code to the message, the access code providing an access to a container of the mobile robot storing the package under delivery.

10. A method, performed by a control system, for arranging a transport of a package to a recipient in a building provided with an elevator system, the method comprises:

determining an access right of a mobile robot carrying the package in response to a receipt of an access request descriptive of requesting an access of the mobile robot to the building, arranging an elevator service to the mobile robot in response to a detection that the mobile robot is provided with the access to the building, and managing a delivery of the package to the recipient in response to a detection that the mobile robot resides in predefined location with respect to the recipient in the building, wherein the step of determining comprises determining the access right based on data identifying the recipient of the package by performing a comparison of the data identifying the recipient of the package with reference data defining persons in the building stored in the control system.

11. The method according to claim 10, wherein the access right of the mobile robot is determined based on data included in the access request received from at least one of: the mobile robot; a robot controller controlling the mobile robot; a monitoring system.

12. The method according to claim 10, the method further comprising: generating, in response to an outcome of a determination that the mobile robot is allowed to access the building, a control signal to open an access door to the mobile robot.

13. The method according to claim 10, wherein in response to an outcome of a determination that the mobile robot is allowed to access the building, the method further comprising:

generating data descriptive of at least one of the following: a route in the building to deliver the package; a utilization of at least one system communicatively available in the building, and delivering the data generated by the control system to the mobile robot.

14. The method according to claim 10, wherein the elevator service is arranged to the mobile robot in response to a detection that the mobile robot resides in the building in a predefined location with respect to an elevator door in a floor of the building the mobile robot resides.

15. The method according to claim 14, wherein the location of the mobile robot is determined based on data received from at least one of: the mobile robot; a sensor system implemented in the building.

16. The method according to claim 10, wherein a control signal is generated to an elevator controller to arrange the elevator service to the mobile robot, the control signal comprising data defining at least one of: the floor the mobile robot resides; a destination floor the mobile robot travels to.

17. The method according to claim 10, wherein the delivery of the package to the recipient is managed by generating a message to the recipient indicative that the mobile robot has arrived at a location of delivery.

18. The method according to claim 17, wherein an access code is included to the message, the access code providing an access to a container of the mobile robot storing the package under delivery.

19. A non-transitory computer readable medium storing a computer program comprising computer readable program code configured to cause performing of the method according to claim 10 when the computer readable program code is run on one or more computing apparatuses.

20. The control system according to claim 1, wherein the control system, in response to a determination that the mobile robot is allowed to access the building, is configured to generate and deliver the mobile robot data descriptive of communication networks and access information for an indoor positioning system within the building.

21. The control system according to claim 1, wherein the elevator service is arranged immediately upon granting access to the building prior to the mobile robot entering the building.

* * * * *